(12) United States Patent
Weber et al.

(10) Patent No.: US 6,843,424 B2
(45) Date of Patent: Jan. 18, 2005

(54) MOTOR VEHICLE WITH A HEATING, VENTILATING AND AIR-CONDITIONING SYSTEM

(75) Inventors: Volker Weber, Appenheim (DE); Frank Jordan, Russelsheim (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/649,498

(22) Filed: Aug. 26, 2003

(65) Prior Publication Data

US 2004/0104279 A1 Jun. 3, 2004

(30) Foreign Application Priority Data

Nov. 30, 2002 (DE) .......................................... 102 56 001

(51) Int. Cl.$^7$ .............................. F24F 7/00; F25D 21/00; G01N 7/00
(52) U.S. Cl. ...................... 236/49.3; 236/91 C; 62/150; 73/29.01
(58) Field of Search ............................... 236/49.3, 91 C, 236/91 F; 62/150, 140, 244; 73/29.01, 335.05

(56) References Cited

U.S. PATENT DOCUMENTS

| 5,884,497 A | * | 3/1999 | Kishita et al. | ................ 62/193 |
| 6,422,062 B1 | * | 7/2002 | King et al. | ................ 73/29.01 |

FOREIGN PATENT DOCUMENTS

| DE | 3624171 A1 | 1/1988 |
| DE | 19813093 C1 | 4/1999 |
| DE | 19907401 A1 | 8/2000 |
| DE | 10039576 A1 | 2/2002 |

* cited by examiner

Primary Examiner—Chen Wen Jiang
(74) Attorney, Agent, or Firm—Laura C. Hargitt

(57) ABSTRACT

In a motor vehicle measured values from a solar sensor (8) and an interior temperature sensor (11) are supplied to a heating, ventilating and air-conditioning system, which sensors are arranged on a common housing. A moisture sensor (13) is additionally arranged on the housing (7) to supply measured values to the HVAC system.

2 Claims, 1 Drawing Sheet

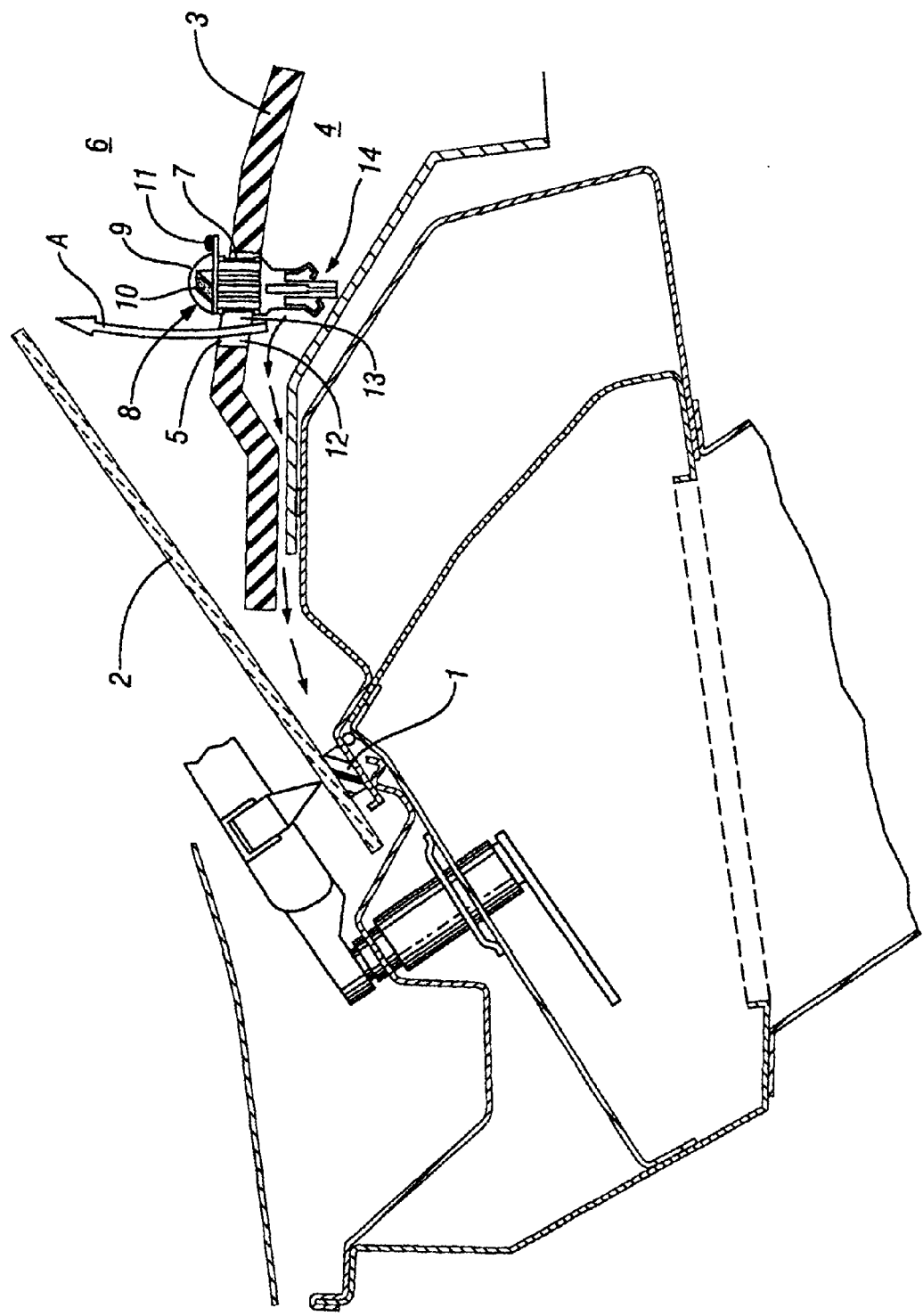

MOTOR VEHICLE WITH A HEATING, VENTILATING AND AIR-CONDITIONING SYSTEM

CROSS-REFERENCE TO RELATED APPLICATIONS

This application is based upon and claims the benefit of priority of the prior German Patent Application No. 10256001.3, filed on Nov. 30, 2002, the contents of which are incorporated by reference.

BACKGROUND OF THE INVENTION

1. Field of the Invention

The invention pertains to a motor vehicle with a heating, ventilating and air-conditioning system to which the measured values of a solar sensor and an interior temperature sensor are supplied, which sensors are arranged on a common housing.

2. Description of the Related Art

DE 36 24 171 A1 discloses a heating and/or air-conditioning system for a motor vehicle which is coordinated with a temperature sensor and at least one moisture sensor. In the interior of the vehicle a first temperature sensor and a first moisture sensor are provided for regulating the interior climate to comfortable values. A second temperature sensor and a second moisture sensor arranged in the exterior region of the vehicle, preferably in the outside air intake channel of the heating and/or air-conditioning system make it possible to condition the drawn-in air before it is blown into the interior. A third temperature sensor and a third moisture sensor arranged near the windshield enable the recognition of an imminent or already existing drop in temperature below the dew point on the interior side of the windshield of the vehicle and the initiation of corresponding countermeasures. The third temperature sensor in the windshield may be omitted if the windshield temperature is estimated from a correlation of the exterior and interior temperature. An improvement in the estimation is possible by additional reference to the signal from a radiation sensor. All sensors are arranged locally separated from one another and in each case electrically connected separately to the regulating device of a heating and/or air-conditioning unit, which results in a considerable cost for installation.

DE 199 07 401 A1 also discloses a process for preventing windshield fogging in a vehicle with which the relative humidity precipitating on a windshield is measured by a moisture sensor as relative humidity and a moisture signal corresponding to the measured moisture is sent to a control device of a ventilation system. To increase driving safety by timely recognition of a fogging of the windshield under all climatic conditions and independently of solar radiation, it is proposed that the control device be supplied with a signal from a solar sensor corresponding to the intensity of the incident solar radiation. From this signal the heating of the moisture sensor is approximately determined and from the heating and the measured relative humidity the actual relative humidity on the windshield surface is determined.

From DE 198 13 093 C1 a motor vehicle with a heating, ventilating and air-conditioning unit is known to which measured values from at least one solar sensor and a temperature sensor are supplied, the temperature sensor and the solar sensor being arranged in a common sensor housing in the vehicle interior. The temperature sensor serves as the only interior temperature sensor for registration of the temperature of the interior of the vehicle. No measurement of the air humidity is envisaged.

BRIEF SUMMARY OF THE INVENTION

The objective of the invention is to devise a motor vehicle of the type mentioned initially which contains an easily installed system of measurement sensors for supplying measured values on the basis of which convenient control of the heating, ventilating and air-conditioning system is achieved.

According to the invention the problem is solved by additionally arranging a moisture sensor on the housing for supplying measured values to the unit.

This measure assures the installation of different sensors in the interior of the vehicle at a low installation cost. The measured values from the solar sensor, the interior temperature sensor and the moisture sensor make it possible to control the heating, ventilating and air-conditioning units in order to achieve a comfortable interior climate.

According to an advantageous version of the invention the interior temperature sensor and the moisture sensor are arranged on the housing in such a way that the interior temperature sensor is blocked off from the airstream emerging from the defroster nozzle, and the moisture sensor extends into a airflow channel of the defroster nozzle. Accordingly a threatening drop in temperature below the dew point which would result in fogging of the windshield exposed to the airstream from the defroster nozzle is detected and suitable countermeasures can be initiated such as switching over to fresh air operation.

For further simplification of the installation the electrical connections of the solar sensor, the interior temperature sensor and moisture sensor are preferably in contact with the control unit of the HVAC system or a vehicle bus by means of a common plug connector. The measured signals are transmitted as timed signals for further processing.

It goes without saying that the aforementioned features as well as those described below may be used not only in the combination reported above but also in other combinations. The scope of the present invention is only defined by the claims.

BRIEF DESCRIPTION OF THE DRAWING

The invention is explained in more detail below with reference to examples of embodiment and to the corresponding drawing. The single FIGURE shows a longitudinal section through the relevant region of the vehicle according to the invention.

DETAILED DESCRIPTION OF THE INVENTION

The vehicle comprises a windshield 2 glued onto a car body flange 1, behind which in the interior of the vehicle an instrument panel 3 is arranged which forms the upper limit of a defroster channel 4 and into which a defroster nozzle 5 is positioned which is directed toward the windshield 2. As indicated by the arrow A the airstream generated by the HVAC unit passes out of the defroster nozzle 5 into the interior space 6 of the vehicle.

A housing 7 of a solar sensor 8 is fastened into the instrument panel 3 and held there secured against rotation. The solar sensor 8 includes sensor elements 10 arranged under a light-permeable hood 9, which sense the incoming solar radiation. An interior temperature sensor 11 on the housing 7 is thermally decoupled from the housing 7 and instrument panel 2. The housing 7 also carries a moisture sensor extending into the flow channel 12 of the defroster nozzle 5, said interior temperature sensor 11 being directed toward the moisture sensor 13 with the housing 7 interposed in order to shield it against the airstream emerging from the defroster nozzle 5. The housing 7 has a plug connector 14 to couple the solar sensor 8, the interior temperature sensor 11 and the moisture sensor 13 to the HVAC system.

What is claimed is:

1. A motor vehicle with a heating, ventilating and air-conditioning system to which measured values from a solar sensor (8) and an interior temperature sensor (11) are supplied, which sensors are arranged on a common housing (7), characterized by the fact that a moisture sensor (13) supplying measured values to the HVAC system is also arranged on the housing (7), and the interior temperature sensor (11) and the moisture sensor (13) are arranged on the housing (7) in such a way that the interior temperature senior (11) is shielded against an airstream emerging from a defroster nozzle (5), and the moisture sensor (13) extends into a flow channel (12) of the defroster nozzle (5).

2. The motor vehicle as in claim 1, characterized by the fact that the electrical connections of the solar sensor (8), of the interior temperature sensor (11) and the moisture sensor (13) contact the control unit of the HVAC installation or a vehicle bus by means of a common plug connector (14).

* * * * *